United States Patent
Jehuda

(10) Patent No.: US 8,874,552 B2
(45) Date of Patent: Oct. 28, 2014

(54) AUTOMATED GENERATION OF ONTOLOGIES

(75) Inventor: Jair Jehuda, Mitzpe Netofa (IL)

(73) Assignee: Rinor Technologies Inc., New York, NY (US)

( * ) Notice: Subject to any disclaimer, the term of this patent is extended or adjusted under 35 U.S.C. 154(b) by 0 days.

(21) Appl. No.: 13/511,382

(22) PCT Filed: Nov. 28, 2010

(86) PCT No.: PCT/IB2010/055461
§ 371 (c)(1),
(2), (4) Date: May 23, 2012

(87) PCT Pub. No.: WO2011/064756
PCT Pub. Date: Jun. 3, 2011

(65) Prior Publication Data
US 2012/0284259 A1    Nov. 8, 2012

Related U.S. Application Data

(60) Provisional application No. 61/264,813, filed on Nov. 29, 2009.

(51) Int. Cl.
*G06F 17/30* (2006.01)

(52) U.S. Cl.
CPC .... *G06F 17/30734* (2013.01); *G06F 17/30672* (2013.01); *G06F 17/30867* (2013.01)
USPC ........... 707/722; 707/740; 707/758; 707/769; 709/206; 709/223

(58) Field of Classification Search
CPC .................... G06F 17/30734; G06F 17/30672; G06F 17/3061; G06F 17/30867
USPC ................. 707/722, 758, 769, 740, 759, 771, 707/E17.002, E17.017, E17.069, E17.074, 707/E17.099, 707, 708, 713, 731, 737, 741, 707/748
See application file for complete search history.

(56) References Cited

U.S. PATENT DOCUMENTS

| | | | |
|---|---|---|---|
| 7,761,480 B2 | 7/2010 | Toledano et al. | |
| 2004/0230572 A1 | 11/2004 | Omoigui | |
| 2006/0106793 A1 | 5/2006 | Liang | |
| 2006/0248045 A1* | 11/2006 | Toledano et al. | 707/716 |
| 2009/0254540 A1 | 10/2009 | Musgrove et al. | |

OTHER PUBLICATIONS

Idealliance, Inc., "PRISM: Publishing Requirements for Industry Standard Metadata; PRISM Specification", Version 1.2, Feb. 26, 2005.
Powell et al., "DCMI Abstract Model", Jun. 4, 2007 (http://dublincore.org/documents/abstract-model/).

(Continued)

*Primary Examiner* — Shahid Alam
(74) *Attorney, Agent, or Firm* — D. Kligler I.P. Services Ltd.

(57) ABSTRACT

A method for data access includes defining an ontology (26) pertaining to a given sphere of knowledge. A computer (22) receives a search query generated using the ontology and provides to a user of the computer at least one document in response to the query. The computer receives tags that the user has associated with data elements in the at least one document and automatically updates the ontology responsively to the tags.

25 Claims, 10 Drawing Sheets

(56) References Cited

OTHER PUBLICATIONS

DCMI Usage Board, "DCMI Metadata Terms", Jan. 14, 2008 (http://dublincore.org/documents/dcmi-terms/).
International Application PCT/IB10/55461 Search Report dated Jun. 10, 2011.
Nadeau et al., "A survey of named entity recognition and classification", Lingvisticae Investigationes, vol. 30, No. 1, pp. 3-265, year 2007.
Bhattacharya et al., "Collective Entity Resolution in Relational Data", ACM Transactions on Knowledge Discovery from Data (TKDD), vol. 1, issue 1, Mar. 2007.
Christensen et al., "Semantic Role Labeling for Open Information Extraction", University of Washington, year 2010.
Feldman et al., "The Text Mining Handbook, advanced Approaches in Analyzing Unstructures Data", Cambridge University Press, 2007.
Hastie et al., "The Elements of Statistical Learning", 2nd edition, Springer Verlag, 2008.

* cited by examiner

AUTOMATED GENERATION OF ONTOLOGIES

CROSS-REFERENCE TO RELATED APPLICATION

This application claims the benefit of U.S. Provisional Patent Application 61/264,813, filed Nov. 29, 2009, which is incorporated herein by reference.

FIELD OF THE INVENTION

The present invention relates generally to methods and systems for providing access to information, and specifically to development and application of ontologies for such purposes.

BACKGROUND OF THE INVENTION

U.S. Pat. No. 7,761,480, whose disclosure is incorporated herein by reference, describes methods for information access using ontologies. As explained in this patent, an ontology is a structured vocabulary that represents the schematic metadata of a particular application domain. The ontology provides a unified, semantic model of the information in the domain, including both the types of entities that the information may include and relationships among the entities. The ontology allows users to express query concepts and relationships in high-level terms, which are then translated by appropriate agents into lower-level database schemata and semantic analyses.

SUMMARY

Construction of ontologies can be a tedious and time-consuming process, requiring substantial investment of the capabilities and time of human experts. The process is further complicated by the fact that ontologies are typically specific to a particular information domain.

There is therefore provided, in accordance with an embodiment of the present invention, a method for data access, including defining an ontology pertaining to a given sphere of knowledge. A computer receives a search query generated using the ontology and provides to a user of the computer at least one document in response to the query. The computer receives tags that the user has associated with data elements in the at least one document and automatically updates the ontology responsively to the tags.

In some embodiments, providing the at least one document includes retrieving a deep Web database table from a Web site, and automatically updating the ontology includes identifying and incorporating a field label from the database table into the ontology. In a disclosed embodiment, retrieving the deep Web database table includes initially submitting a form to the Web site with initial values of fields in the form selected by the user, and subsequently submitting the form to the Web site automatically with further values of the fields generated by the computer. Typically, retrieving the deep Web database table includes receiving multiple Web pages from the Web site containing the data elements, and automatically extracting and filtering the data elements from the Web pages so as to present the data elements to the user as relational records in the table.

In one embodiment, automatically filtering the data elements includes applying multiple filters to generate multiple, respective relational records for selection by the user, and choosing one of the filters responsively to the selection made by the user. Alternatively or additionally, automatically filtering the data elements includes automatically analyzing a structure of the Web pages in order to construct a filter for application to the data elements.

Automatically updating the ontology may include identifying synonymous terms. Additionally or alternatively, automatically updating the ontology may include identifying relationships between entities in the ontology. Typically, identifying the relationships includes automatically identifying a relationship and presenting the relationship to the user for confirmation before adding the relationship to the ontology. Further additionally or alternatively, automatically updating the ontology may include presenting updates to the ontology based on user tagging to an expert in the sphere for confirmation before propagating the updates to other users.

In some embodiments, the method includes gathering multiple dots from data sources in the sphere, and automatically tagging and aggregating the dots responsively to the ontology.

There is also provided, in accordance with an embodiment of the present invention, a method for data access, including receiving in a computer multiple ontologies, each ontology pertaining to a respective sphere of knowledge. Commonalities between the ontologies are automatically identifying. Based on the commonalities, a super-ontology is built, containing elements that are common to multiple spheres of the knowledge. An ontology for a specific sphere of knowledge is automatically defining based on the super-ontology.

Automatically defining the ontology may include building a new ontology for a new sphere of knowledge that was not used in building the super-ontology. Alternatively or additionally, automatically defining the ontology may include propagating an element defined in a first ontology of a first sphere of knowledge into a second ontology of a second sphere of knowledge.

In some embodiments, identifying the commonalities includes matching an entity that occurs in the ontologies of two or more of the spheres. Typically, building the super-ontology includes merging into the super-ontology relationships and structures that are associated with the entity in each of the ontologies. Additionally or alternatively, identifying the commonalities includes automatically assessing a confidence of the matching of the entity between the ontologies, and building the super-ontology includes deciding whether to merge the entity from the two or more of the spheres into the super-ontology based on the confidence.

In a disclosed embodiment, the method includes merging data values that are respectively associated with the spheres of knowledge into a common knowledge base responsively to the super-ontology.

The method may include receiving a query from a user in terminology associated with the ontology of one of the spheres of knowledge, and translating the query into the super-ontology in order to generate a response. Typically, the response is translated back into the terminology associated with the ontology of the one of the spheres of knowledge for presentation to the user.

There is additionally provided, in accordance with an embodiment of the present invention, apparatus for data access, including a memory, which is configured to store an ontology pertaining to a given sphere of knowledge. A processor is configured to receive a search query generated using the ontology, to provide to a user of the apparatus at least one document in response to the query, to receive tags associated by the user with data elements in the at least one document, and to automatically update the ontology responsively to the tags.

There is further provided, in accordance with an embodiment of the present invention, apparatus for data access, including a memory, which is configured to store multiple ontologies, each ontology pertaining to a respective sphere of knowledge. A processor is configured to automatically identify commonalities between the ontologies, to build, based on the commonalities, a super-ontology containing elements that are common to multiple spheres of the knowledge, and to automatically define an ontology for a specific sphere of knowledge based on the super-ontology.

There is moreover provided, in accordance with an embodiment of the present invention, a computer software product, including a computer-readable medium in which program instructions are stored, which instructions, when read by the computer, cause the computer to store an ontology pertaining to a given sphere of knowledge, to receive a search query generated using the ontology, to provide to a user of the product at least one document in response to the query, to receive tags associated by the user with data elements in the at least one document, and to automatically update the ontology responsively to the tags.

There is furthermore provided, in accordance with an embodiment of the present invention, a computer software product, including a computer-readable medium in which program instructions are stored, which instructions, when read by the computer, cause the computer to store multiple ontologies, each ontology pertaining to a respective sphere of knowledge, to automatically identify commonalities between the ontologies, to build, based on the commonalities, a super-ontology containing elements that are common to multiple spheres of the knowledge, and to automatically define an ontology for a specific sphere of knowledge based on the super-ontology.

The present invention will be more fully understood from the following detailed description of the embodiments thereof, taken together with the drawings in which:

DETAILED DESCRIPTION OF EMBODIMENTS

Definitions

Figure 1:
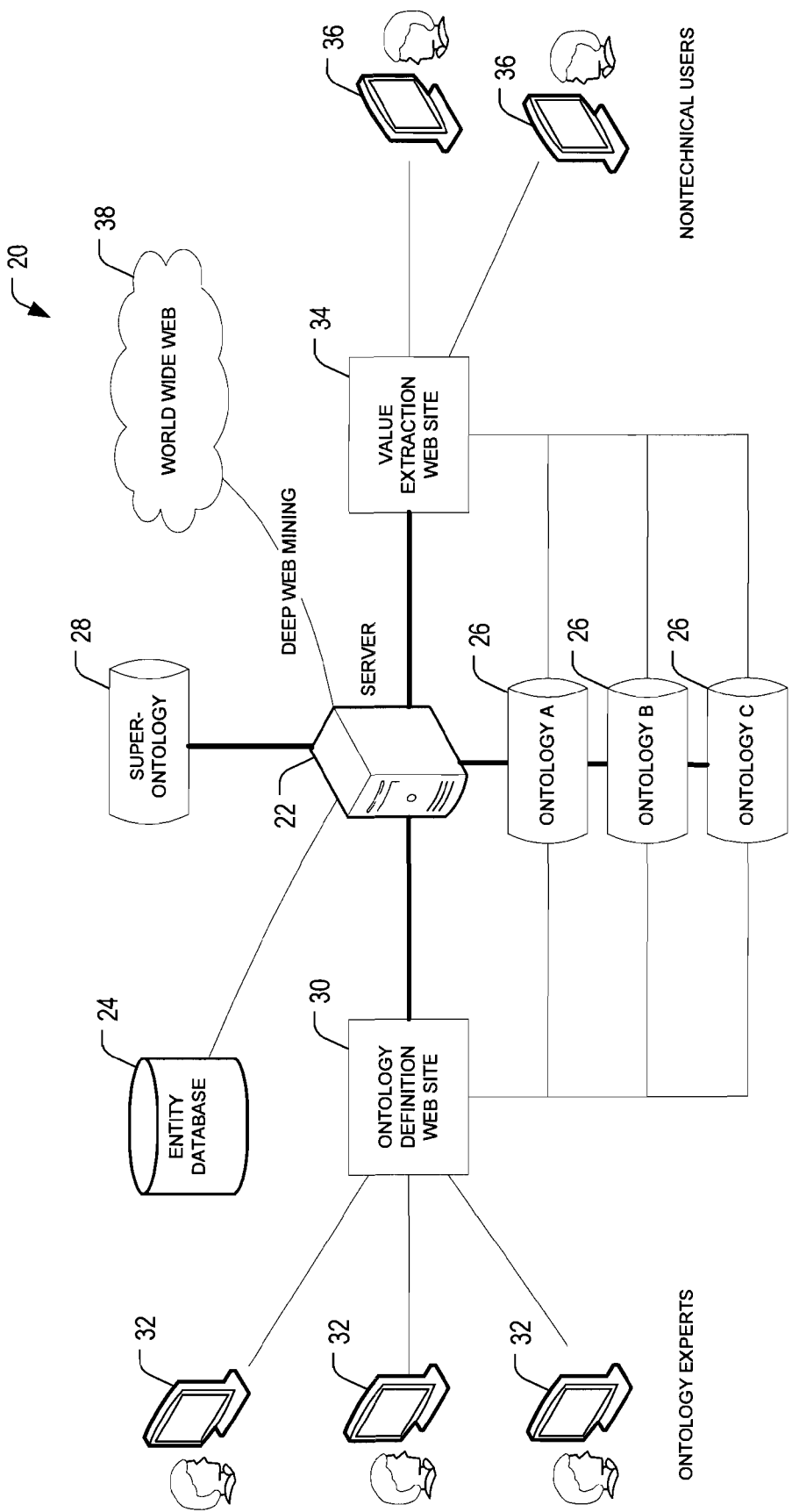
FIG. 1 is a block diagram that schematically illustrates a data access system, in accordance with an embodiment of the present invention.

In the description that follows and in the claims, the following terms should be understood as defined below.

Sphere: A knowledge domain, and particularly a domain that is sufficiently small so that semantic technologies can be highly effective in the process of acquiring knowledge assets within the sphere. Each sphere has a well-defined community of members with access rights to these assets, as well as an evolving set of member-qualified private and public resources available to each sphere. Each member has an identity or nickname as well as a degree of expertise within that sphere, which impacts the qualification process. Each sphere may also have different asset usage and sharing policies, e.g., private sources might be available only to members with a premium subscription and members may or may not share private sources and their specific queries.

Spherical search: Search using spheres to extend the search to the sphere-discovered deep Web, constrain the results to well-defined degrees of qualification (expert, power, any member, other), and automatically expand keywords to synonyms and instances of the specified keyword.

Mashups: The results of query with constraints (typically expressed in SQL). Mashups can also be categorized to belong to specific member categories, e.g., physicians specializing in Alzheimer's disease. Templates may be maintained in each sphere by order of popularity so that users can adopt and personalize for their use.

Ontological tag (onto-tag): A specification of the semantic nature of a data element. For example, an ontological tag may specify that a string represents a user name or address. Ontological tags may be hierarchical.

Dot: Any value (e.g., the attribute of an entity) or content segment (e.g., page, figure, table, paragraph, field or annotation) acquired and refined by a semantic search system 100. Appropriately onto-tagged dots can be automatically harmonized (transformed and aggregated) with other dots on demand.

Overview

Human-understood data is available everywhere, but it becomes truly useful only when qualified data from reliable sources has been transformed into machine-understood knowledge that can be automatically retrieved, aggregated and presented on demand for specific purposes.

Transforming data into knowledge has typically required a tedious process of qualifying sources, locating and extracting relevant data subsets within those sources, deciphering the data semantics (meaning), mapping the structure and semantics of each data subset to a unified domain-specific data format (schema), cleansing and transforming the data into the unified format, and then merging the transformed subsets into a single actionable dataset that can be easily retrieved and processed. Merging data from multiple sources is non-trivial since content might be similar, supportive or contradictory. Correlating data from multiple datasets involved development of global keys and appropriate mapping of local keys to the global keys. When using sources governed by usage policies, user authorizations per source should also be considered. The above process of combining data from disparate data subsets into a single unified data set for a specific user need is referred to as data "harmonization."

Though many aspects of data harmonization can be automated, some degree of human attention is typically needed throughout the process, be it in qualifying sources, selecting the relevant data within them, deciphering their semantics, mapping to a schema and dealing with conflicts. Conventional Web mining and EII (enterprise information integration) tools, for example, require that the data views and sources be predefined. Trained experts (e.g., database administrators) can then configure these tools to automatically authorize access to those sources, extract the required data, transform that data into a unified format and join the data to populate those views with the latest data—on demand. Configurations are manually adjusted by experts when views and sources evolve, new sources are added and policies change.

More and more contexts, however, deal with rapidly changing landscapes, volumes of sources, dynamic policies and ad hoc user views. Delivering economically viable knowledge access solutions can be challenging even for contexts that have only one of these characteristics. As globalization forces change even in contexts that were once stable, deployed solutions are having difficulties keeping up with the accelerating pace of change in their landscapes, sources, policies and views.

To address these challenges, the architects of the W3C propose to augment the existing Web with formal descriptions of the concepts, terms and relationships being used in each site. Such augmentations would ultimately produce a "Semantic Web" that enables machines to automatically discover and harmonize data on demand. Unfortunately, practical implementations of this objective have not yet been found. Standard semantics might also be impossible to achieve in a world driven by diversification and evolution.

Embodiments of the present invention provide a viable economical model and apparatus for harmonizing data on demand in massive, ever-changing landscapes with dynamic policies. Such embodiments can be used to automatically build and maintain a Semantic Web. Rather than requiring Web site owners to independently build and maintain Semantic Web augmentations for their Web sites, the embodiments described below provide such augmentation automatically, in a manner that facilitates semantic convergence crucial to interoperability between Web sites. These embodiments thus enable computers to rapidly achieve a high level of data organization and to provide quicker, more efficient access to large bodies of stored data.

Embodiments of the present invention combine expert know how in data mining and aggregation with collective frameworks for mass-cultivation of shared information by communities of ordinary users, by means of a comprehensive and coherent framework. The result is a personalized needs-centric (rather than site-centric) Web experience that synergizes user activities via independent spheres of shared knowledge. Nearly all of the knowledge cultivation activities within each sphere are carried out by groups of typical users and power users (sometimes referred to as "crowds"). Experts need only establish a core and provide minimal steering and maintenance activities that can readily be crowd-sourced at a diminishing cost. Commercial motives may be built into the technical and business fabric of the proposed framework. A growing number of spheres of shared knowledge can thus be spawned and cultivated to ultimately cover all areas of sufficient interest.

Some embodiments of the present invention provide method for data access in which an ontology is defined pertaining to a given sphere of knowledge. The ontology may be initially defined, for example, by an expert or group of experts in the relevant field, but it is then automatically refined and augmented by a computer based on inputs by ordinary users, who need not even be aware that they are taking part in the process. When the computer receives a search query generated using the ontology and provides a document in response to the query, the user is offered the option of tagging data elements in the document. The computer uses the tags applied by the user in automatically gathering semantic knowledge in the given sphere, and updates the ontology accordingly.

In some cases, the computer provides the user with deep Web data from a Web site, often in the form of database tables. The "deep Web" in this context refers to dynamic Web pages, which are typically generated in response to user queries using database information accessed by the Web server. The deep Web is largely ignored by current search engines, but it contains a great wealth of data, which is made more useful because it is often in structured or semi-structured form. Deep Web pages with underlying databases are thus excellent sources for acquiring not only sphere-specific data, but also thesauri of synonyms.

Hence, in an embodiment of the present invention, a computer provides the user with access to deep Web pages. It then applies user tagging and automatic processing of these pages in updating the ontology by identifying and incorporating one or more field labels from the database table into the ontology. For example, given a table of semi-structured information, the computer may use semantic mapping to automatically analyze the content of each table column so as to identify the probable semantic meaning per column. The computer then presents the user with a short list of ranked semantic tags for selection. In this way, typical users can semantically tag large volumes of semi-structured data (i.e., the data within each table column) within a few minutes. Appropriately tagged table columns can then be automatically atomized, normalized and merged with data from other sources.

Other embodiments build and use a super-ontology in order to automatically define multiple sphere-specific ontologies. For this purpose, the computer identifies commonalities between the sphere ontologies and builds the super-ontology from elements that are common to multiple spheres of the knowledge. In this manner, the computer can propagate elements defined in the ontology of one sphere of knowledge into other ontologies for other spheres. The super-ontology can also be used in rapidly building new ontologies for spheres of knowledge that were not used initially in building the super-ontology. The ability to propagate ontological knowledge among different spheres in this manner enhances the scalability of ontology definition, so that many sphere-specific ontologies can be created and gradually expanded at a reasonable cost.

System Description

FIG. 1 is a block diagram that schematically illustrates a data access system 20, in accordance with an embodiment of the present invention. The system is built around at least one computer 22, with a suitable memory 24 (which may comprise a combination of volatile memory and non-volatile storage media, and may hold an entity database, as described below, inter alia) and other computing and communication resources needed to implement the methods described below. Computer 22 is identified, for convenience and simplicity, as a single "server" in FIG. 1, but in practice the processing function may be distributed among multiple clustered servers or other computers. Typically, these computers are general-purpose processors, which are programmed in software to carry out the functions described herein. The software may be conveyed to the computers in electronic form, over a network, for example, or it may, alternatively or additionally, be stored on tangible computer-readable media, such as optical, magnetic, or electronic memory media.

One or more domain experts use computer terminals 32 to access an ontology creation tool, which may be available, for example, on a server or other computing platform via an ontology definition Web site 30 or via any other suitable type of interface. Terminals 32 typically comprise personal computers or other computing devices with appropriate display and communication capabilities. The experts use this tool to create sphere-specific ontologies 26. Methods and tools for initial creation of specific ontologies by domain experts are commercially available. For example, the Protégé ontology editor, available at protégé.stanford.edu, may be used for this purpose.

The system implemented by computer 22 builds on individual sphere-specific ontologies 26 to automatically create a super-ontology 28. The process of creating the super-ontology is described hereinbelow with reference to FIG. 9.

Figure 10:
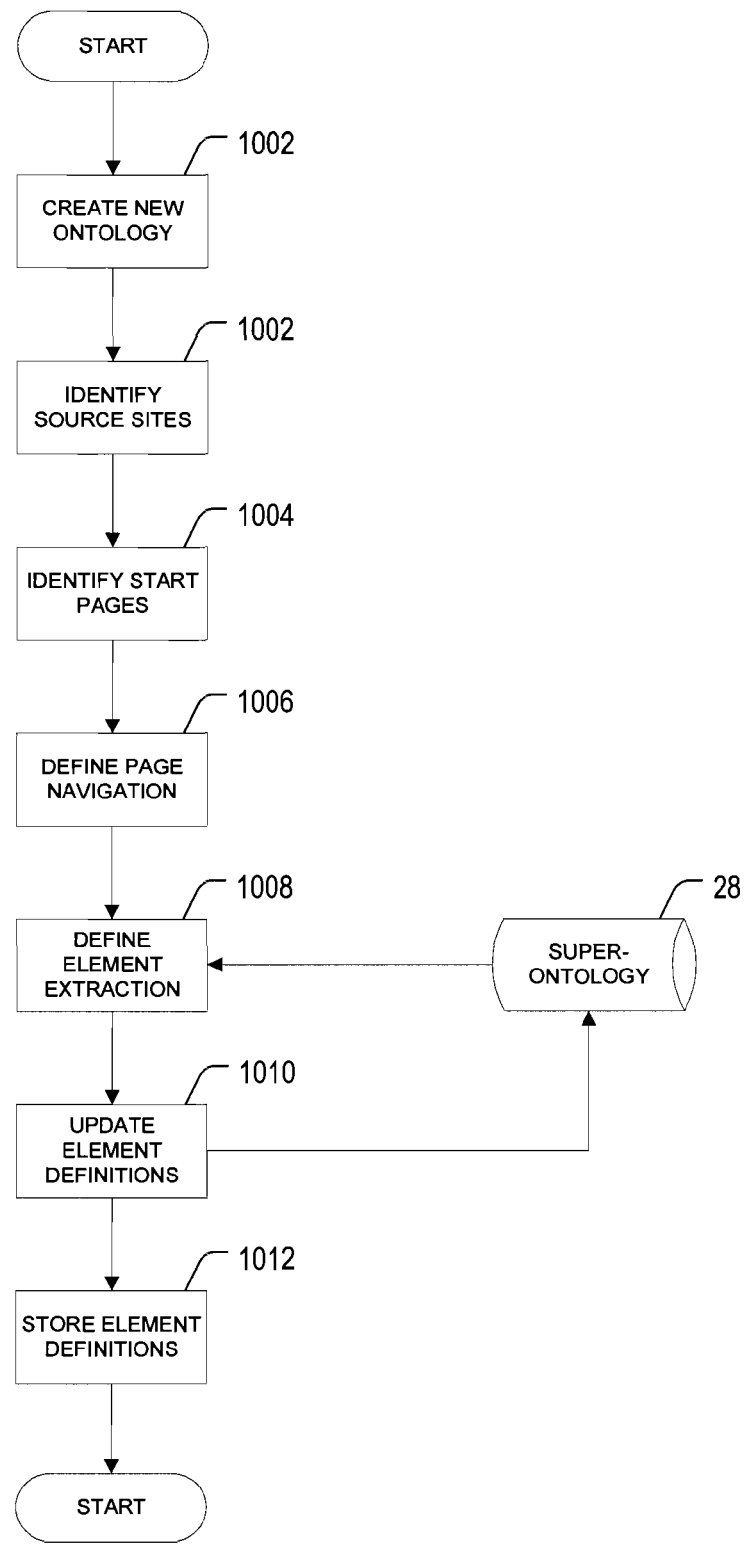
FIG. 10 is a flow chart that schematically illustrates a method for definition of an ontology using a super-ontology, in accordance with an embodiment of the present invention.

Super-ontology 28 is used both in the creation and/or modification of sphere-specific ontologies 26 (as shown in FIG. 10), and in deep Web mining of the World Wide Web 38 and/or other data sources, such as corporate intranets and other systems with suitable data sourcing capabilities, including database systems. The use of the entity and relationship definitions in the super-ontology allows for a more complete and extensive extraction of data from deep Web sources, since the data extraction done under the direction of each sphere-specific ontology will also extract information defined in other sphere-specific ontologies without requiring separate generation of the deep Web pages for each sphere-specific ontology.

Figure 9:
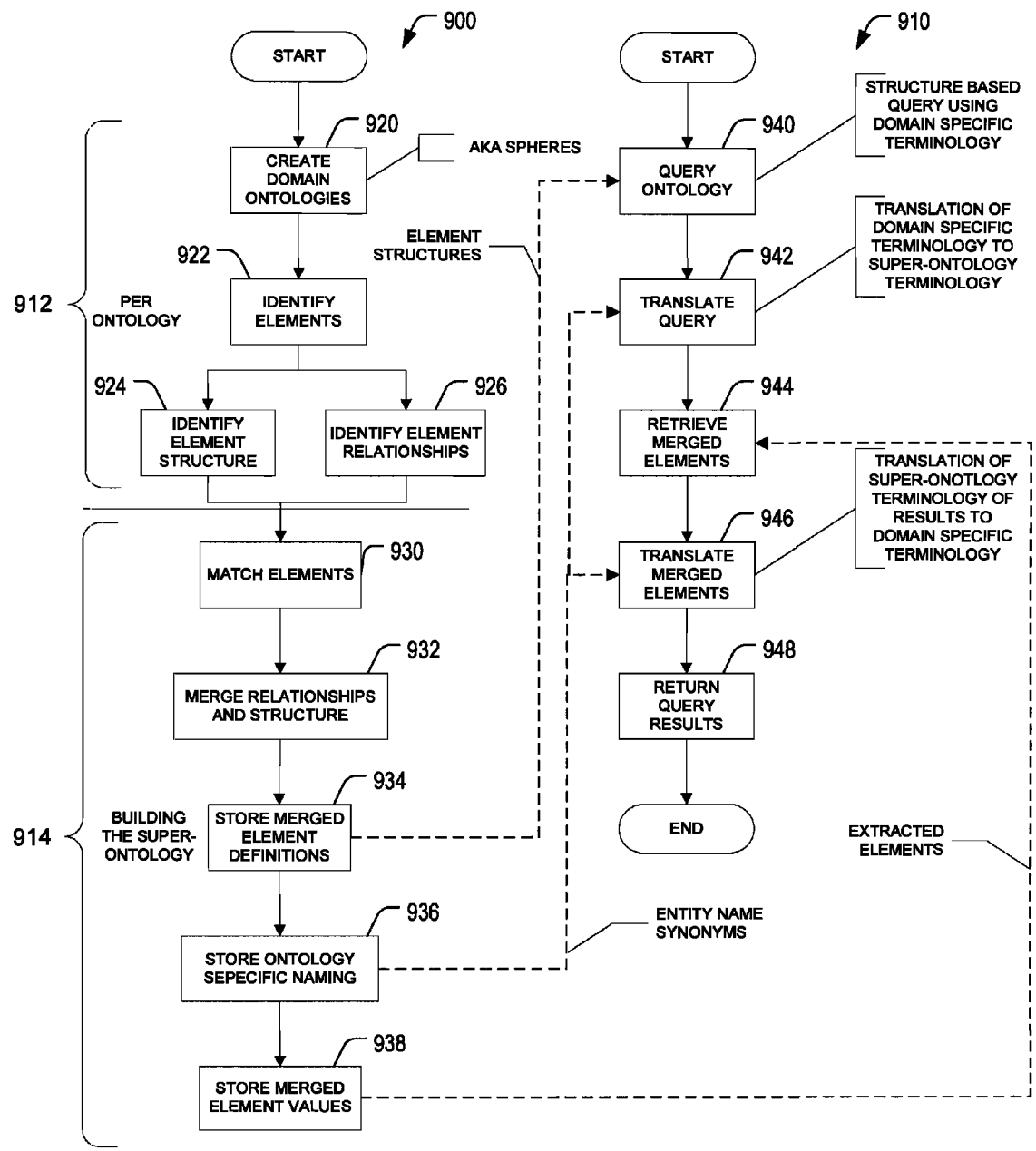
FIG. 9 is a flow chart that schematically illustrates methods for creation and use of a super-ontology, in accordance with an embodiment of the present invention.

The data extracted from deep Web mining is stored in an entity database in memory 24. Users who are not necessarily technical experts may access this stored data using a value extraction tool (also referred to as a query tool). For this purpose, the users may, for example, access a value extraction Web site 34, or any other suitable interface for specify queries and values of interest, via their user terminals 36. Terminals 36, like terminals 32, typically comprise personal computers or other computing devices with appropriate display and communication capabilities. The value extraction tool typically uses terminology defined by a sphere-specific ontology 26, but may use the generic terminology defined by super-ontology 28. The super-ontology typically uses a composite of the terminologies used in the various sphere-specific ontologies, as each sphere may have a specific terminology even for values, types and relationships that might be shared with other spheres that use different, synonymous, terms for the shared elements. The extraction of data from the entity database using sphere-specific terminology is also shown in FIG. 9.

Figure 2:
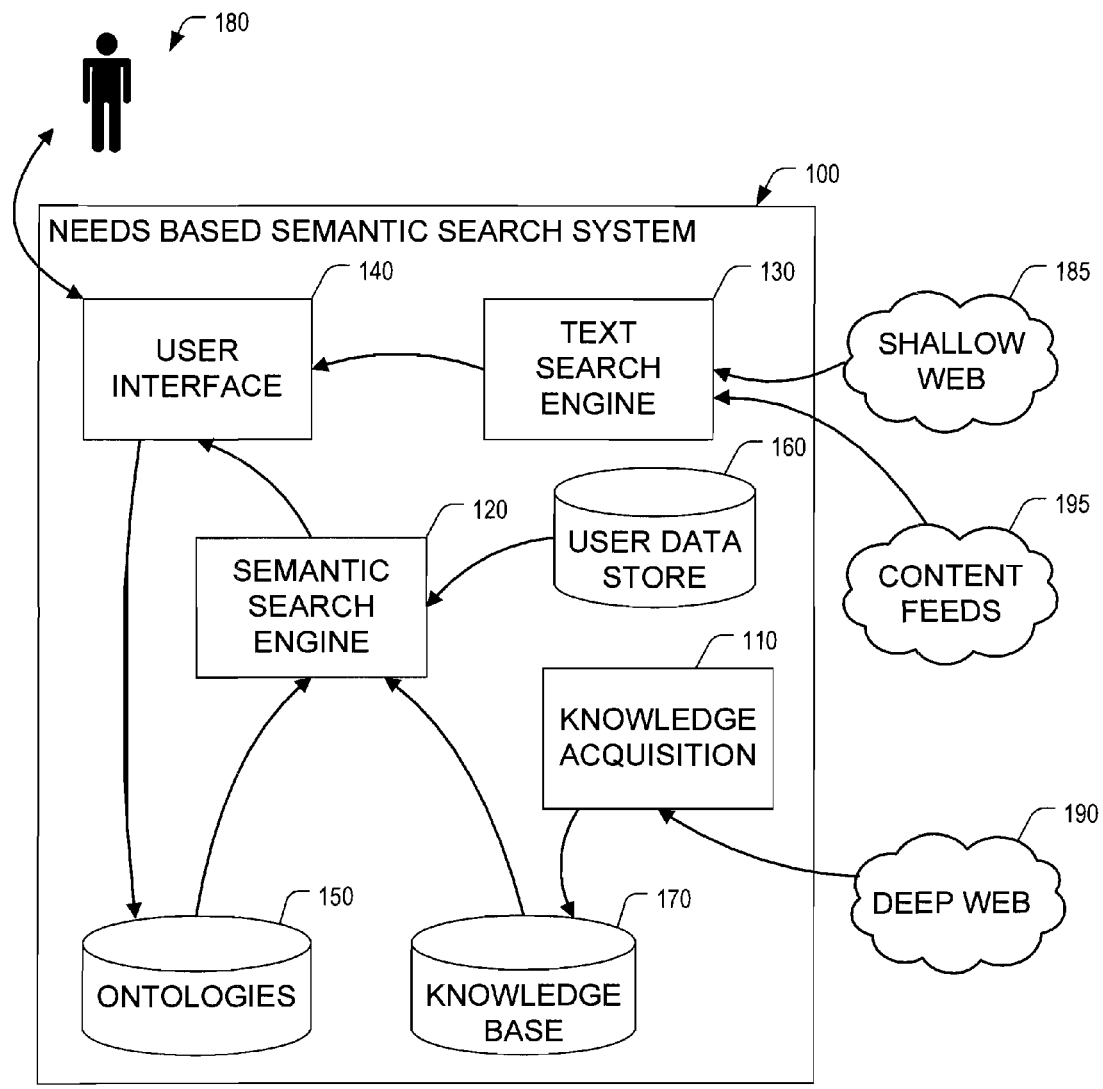
FIG. 2 is a block diagram that schematically illustrates functional elements of a needs-based semantic search system and external elements that interact with the system, in accordance with an embodiment of the invention.

FIG. 2 is a block diagram that schematically illustrates functional elements of a needs-based semantic search system 100 and external elements that interact with the system, in accordance with an embodiment of the invention. System 100 uses some of the resources of system 20 and gives a functional view of services that the system can provide to users. Specifically, the computing functions of system 100 may be carried out by computer 22, while the storage functions may be implemented in parts of memory 24.

System 100 comprises the following elements: A knowledge acquisition element 110, a semantic search engine 120, an optional text search engine 130, a user interface 140, one or more ontologies 150 (equivalent to ontologies 26 in FIG. 1), a user data store 160 and a knowledge base 170. FIG. 2 also shows external elements which interface to the needs based semantic search system 100: a user 180, shallow Web data sources 185, deep Web data sources 190 and content feeds 195.

Knowledge acquisition element 110 and semantic search engine 120 interact with user interface 140 to maintain identities and content across multiple user devices, to manage development of ontologies 150 and facilitate the ongoing Web mining of popular sites. The mined content is maintained within sphere-specific repositories in knowledge base 170. Knowledge acquisition element 110 and semantic search engine 120 also facilitate on-demand joining of data to populate user mashups from authorized internal and external information silos and notify user 180 as needed.

Data sources are external components of system 100, which are used to provide data elements. The identity and operational characteristics of each data source are associated with one or more spheres. When associated with multiple spheres, the data source associations allow cross-sphere synergy. As noted above, the data sources include shallow Web sources 185, deep Web sources 190 and content feeds 195, such as online news sources and RSS feeds. Shallow web sources 185 are static Web pages reachable by traversing links between pages.

Deep Web sources 190 are those that are dynamically generated by Web sites in response to a user query, such as a user-specified internal search or a set of constraint values selected by a user. The information presented in these dynamic pages is typically contained within an underlying site database designed for presentation purposes. Conventional search engine crawlers are generally unable to index these pages. More than 99% of the Web is deep and for this reason, nearly 95% of the Web remains un-indexed by major search engines. Due to their dynamic generation, these deep Web pages generally require different search techniques from shallow Web source 185. In an embodiment of the present invention, users identify the location of deep Web sources 190 via user interface 140, and knowledge acquisition element 110 extracts data from these sources using automatic table recognition. Access to deep Web pages 190 may require user authentication.

Both shallow Web sources 185 and deep Web sources 190 sources may be processed using techniques of named entity recognition and information extraction, in order to identify and extract data elements and data relationships respectively. Tools that can be used for these purposes are described, for example, by Nadeau et al., in "A Survey of Named Entity Recognition and Classification," *Lingvisticae Investigationes* 30:1 (2007), and by Bhattacharya et al., in "Collective Entity Resolution in Relational Data," *ACM Transactions on Knowledge Discovery from Data (TKDD)* 1:1 (2007), both of which are incorporated herein by reference. Extracted data elements and data relationships are associated in system 100 with the source Web page.

Content feeds 195 are other textual data sources such as blogs, news feeds, RSS feeds, etc. Feeds 195 can be used in the same way as sources 185 for data element and data relationship extraction. As with deep Web sources 190, access to shallow Web sources 185 and feeds 195 may require user authentication.

For each data source, knowledge acquisition element 110 and semantic search engine 120 may maintain a monetary value and qualifying user attributes. The monetary value may be determined by the role and degree that the data source has played in generating revenue, e.g. how often it has been requested by users or appeared with served advertisements. These sources may also be associated with the users that contributed them to system 100. A portion of the revenue generated by such data sources may be allocated to the contributing users in order to encourage users to identify additional data sources. The attributes of the contributing user, such as the user's level of expertise in the relevant sphere, can also be used to filter the data sources used in generating a mashup. Qualifying user attributes are stored in user data store 160 with other user-specific attributes described below.

User interface 140 enables users to semantically search, tag, annotate, recall, query, mashup, qualify, request mining, and share information. The user interface enables the user to administer and change his/her identity within one or more spheres. User content can be cached for off-line work.

A set of sphere-specific ontologies 150 is maintained for use by semantic search element 120 and is updated based on input via user interface 140 through user tagging, annotation, and confirmation of relationships. Typically, the creation of an initial ontology is done by sphere experts. Subsequent refinement may be done by any user to address his or her needs, but these refinements are typically adopted by the sphere only when approved by a qualified user.

For the sake of brevity, FIGS. 1 and 2 and the description above relate only to those system elements that are directly relevant to implementation of embodiments of the present invention. Other elements and capabilities of such as system may be drawn, for example, from the above-mentioned U.S. Pat. No. 7,761,480, as well as from other sources that are known in the art.

Semantic Queries and Deep Web Data Extraction

Figure 3:
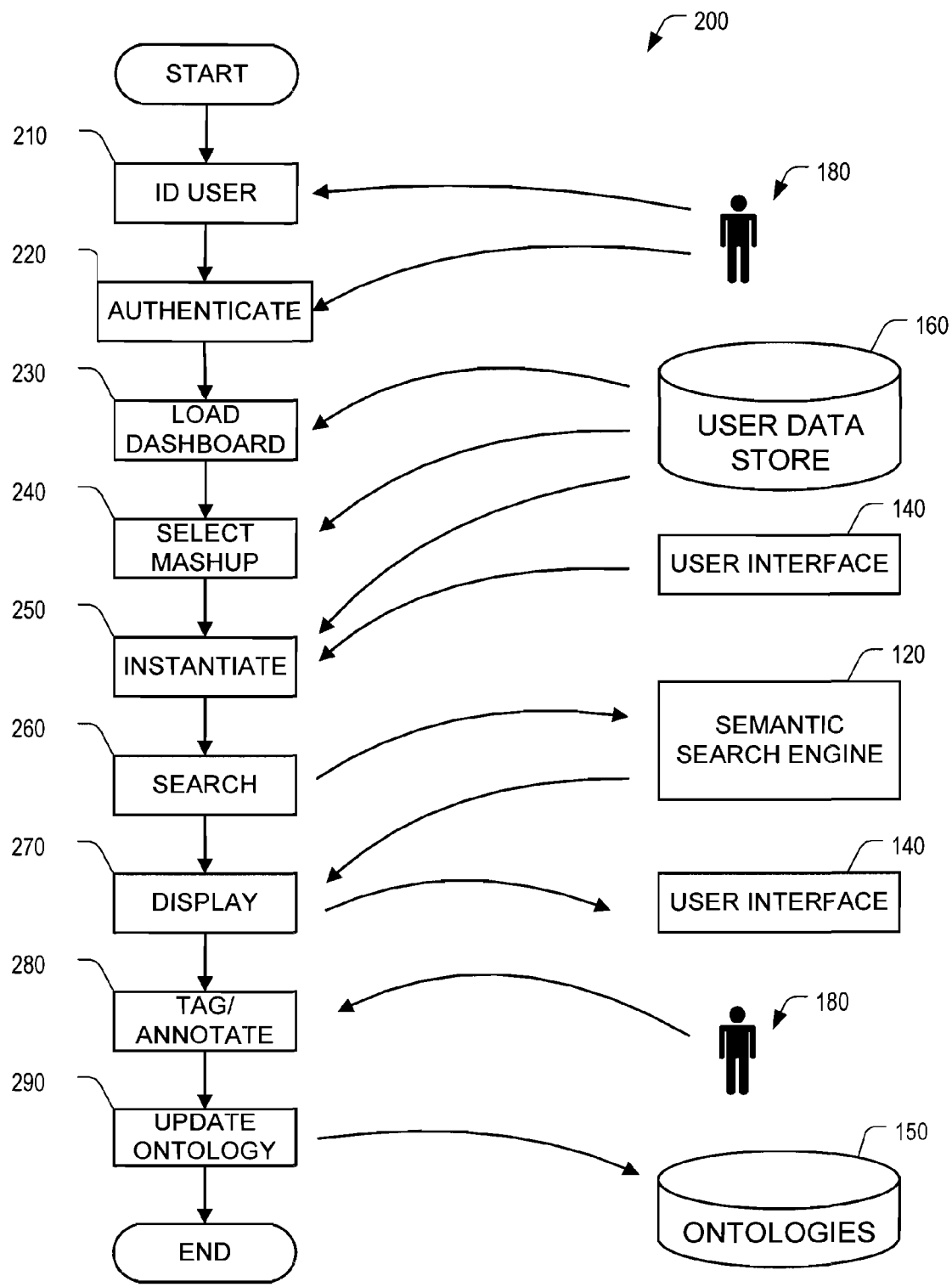
FIG. 3 is a flow chart that schematically illustrates a sequence of actions taken when using a needs-based semantic search system, in accordance with an embodiment of the invention.

FIG. 3 is a flow chart that schematically illustrates a process 200 carried out in using needs-based semantic search system 100, in accordance with an embodiment of the invention. Knowledge acquisition element 110 and semantic search engine 120 use sphere-specific and global elements to satisfy a semantic query in the form of an instantiated mashup template. Process 200 includes creating a semantic query, satisfying the query, and use of the resulting data.

The process of creating a semantic query is initiated by identification 210 and optional authentication 220 of the user. The identification of the user allows the use of user-specific semantic queries stored in user data store 160. Authentication of the user allows the use of data sources and services requiring user authentication. Examples of such data sources and services include subscription-based news feeds and pay-for-use deep Web data sources.

The semantic query may be created by the user using a dashboard, which is loaded in step 230. The user selects a mashup template 240 from a set of mashup templates associated with the user and sphere. A set of persistent mashups is termed a dashboard and is loaded from user data store 160 in step 230. The user instantiates 250 the mashup template by providing search parameters and constraints using user interface 140 or user-specific values stored in user data store 160 from a previous use of the mashup.

The instantiated mashup template is used by semantic search engine 120 to direct a semantic search 260 of the data sources associated with the sphere. The data sources may include shallow Web sources 185, content feeds 195 and/or data previously extracted from deep Web sources 190 and stored in knowledge base 170. The semantic search itself may use components that are known in the art to perform semantic Web mining and semantic aggregation. Such components are described, for example, by Feldman et al., in *The Text Mining Handbook: Advanced Approaches in Analyzing Unstructured Data* (Cambridge University Press, 2007), and by Christensen et al., in *Semantic Role Labeling for Open Information Extraction* (University of Washington, 2010), both of which are incorporated herein by reference.

System 100 uses the result of semantic search 260 to build a table by creating table rows using the values returned by the semantic search and table layout and formatting defined by the mashup template. The resulting table is displayed 270 to user 180 via user interface 140, and can optionally be stored for subsequent reuse.

The user can also use user interface 140 to provide feedback to the semantic search process by tagging 280 values (also referred to as annotating) displayed in user interface 140, or may take other actions that are described below. This feedback may then be used to update 290 ontologies 150 used in the semantic search process.

Figure 4:
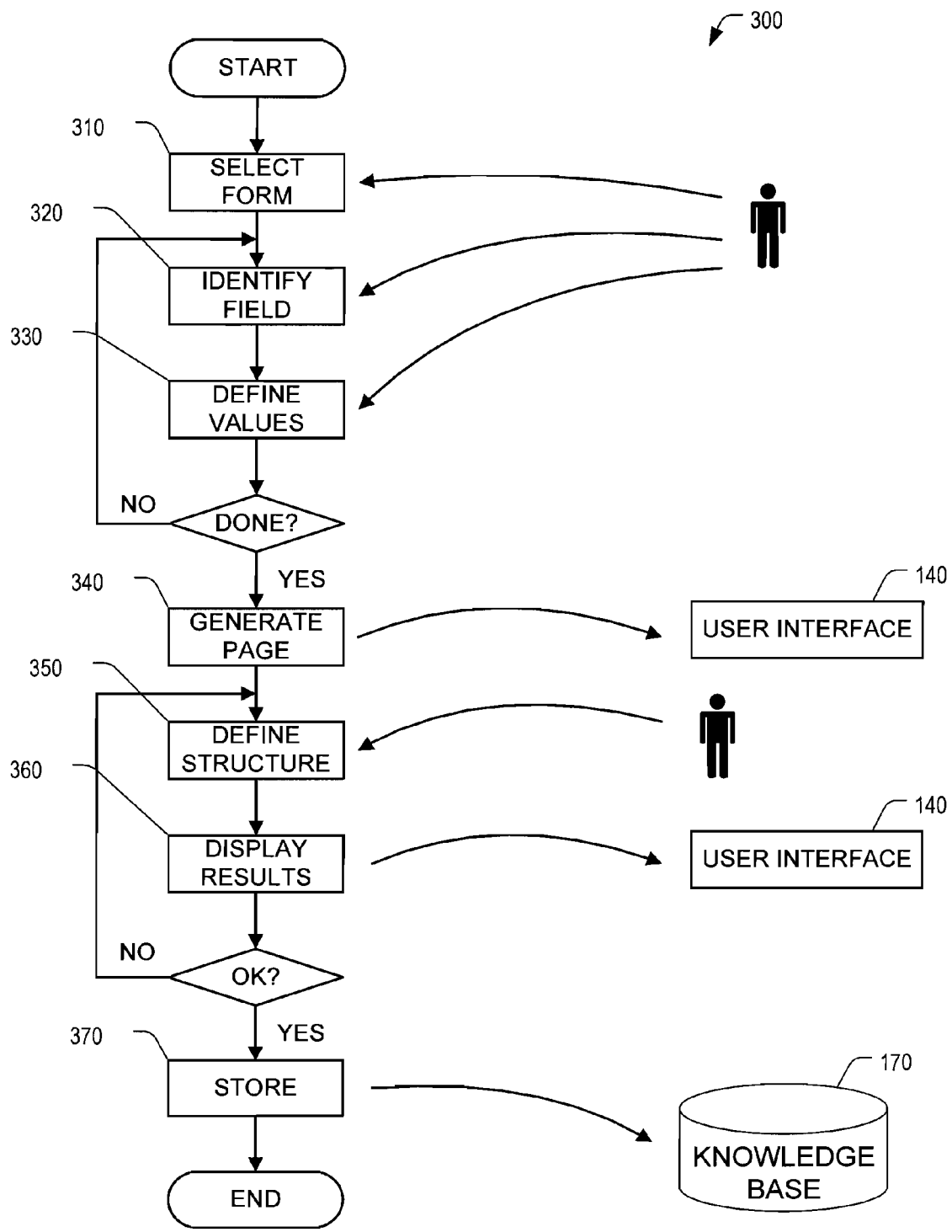
FIG. 4 is a flow chart that schematically illustrates a sequence of actions taken when identifying a deep Web data source for use by a knowledge acquisition element, in accordance with an embodiment of the invention.

FIG. 4 is a flow chart that schematically illustrates a process 300 that occurs when identifying one or more deep Web sources 190 for use by knowledge acquisition element 110, in accordance with an embodiment of the invention. The knowledge acquisition element uses the sphere-specific ontology and data sources to build a data store containing data elements extracted from the data sources, for use in satisfying semantic queries associated with the sphere. The extraction of data elements can use methods of semantic Web mining, semantic acquisition, named entity recognition, and information extraction, as described above, as well as semantic matching and fusion. In process 300, system 100 identifies deep Web data sources, identifies the values available from such sources, and stores these identifications in knowledge base 170.

Deep Web data sources are initially identified by users. Normally the deep Web data source or entry point is a Web page containing a form 310 selected by the user. The data dynamically generated when the form is submitted depends on the values provided by the user. Often the form is completed by entering text values in input fields and by selecting values from lists of options.

Instantiating the deep Web source requires both identifying fields 320 of the form and also defining relevant values 330 for all fields that are used to select the data to be displayed in the generated Web page. The values for fields with selectable lists of options can be extracted from the HTML code of the form. The user may identify unusable options such as directions ("Select one-") or separators (e.g., "____"). Values for free form fields may be entered by the user as a list of options. The process of identifying fields 320 and field values 330 is repeated until all fields required for generation of dynamic Web pages is completed.

The form is submitted to the Web site one or more times with valid field values, and the data selected in response to the field values is used by the Web site in generating a Web page 340, which is displayed to the user via user interface 140. The user can then define a structure 350 of the generated Web page by identifying structural elements, such as text present before repeated elements, text present after repeated elements, and the data elements contained within each repeated element, which is referred to as a record. System 100 may identify the records by features such as their labels, style, position, data type, and named element recognition. The system then generates a filter to automatically extract the records (repeated elements) in each dynamic page. The identified records are extracted as a data table and subsequently atomized (decomposed into atomic values), normalized and cleansed before being stored in knowledge base 170.

The data extracted from the generated Web page are presented to the user for confirmation as a table of relational records in step 360. In cases of ambiguity, several potential filters may be produced, whereupon the user chooses the appropriate filter by example, i.e., by choosing that filter that produced the intended set of records.

If the records accurately contain the data from the generated Web page, then the source, parameter and field information is stored 370 in knowledge base 170 for use in extracting data from the deep Web data source. Knowledge acquisition element 110 automatically submits the form to the appropriate Web server multiple times with all combinations of the identified parameters. It then analyzes the resulting generated Web pages using the chosen filter to extract the records and adds to each record the parameters used to generate the Web page. The data are arranged as relational records containing the generating parameters and the data elements extracted from each of the repeated elements on the generated Web pages. The relational records are stored in knowledge base 170 for subsequent use in satisfying semantic queries.

In addition to the above manual method of identifying data elements returned in response to a deep Web query, system 100 may use an automatic method based on the formatting of table. A relatively small number of filter generation genres automatically produces likely filter candidates, whereupon the user can select the appropriate filter by example. Some genres perform well for HTML tables, for example, some for a single record per page, some for multiple records per page, some for PDF tables, etc. Rather than attempting to recognize records by their source, knowledge acquisition element 110 can recognize them by the way they appear in the output presentation.

Thus, for example, in the case of a table, element 110 identifies the textual elements used to indicate table row and column headings and the repeated data elements. The textual elements used to indicate row and column headings may include font styles, such as the use of bold or italic fonts or distinct font sizes. The use of lines and/or repeating textual elements used to create the impression of lines, such as dashes ("—") and vertical bars ("|"), can serve as a basis to identify a table in the generated output. The identification of tables based on their presentation to the user, in distinction to recognizing tables in the source language (e.g., PDF or HTML), simplifies the search and use of tables.

Figure 5:
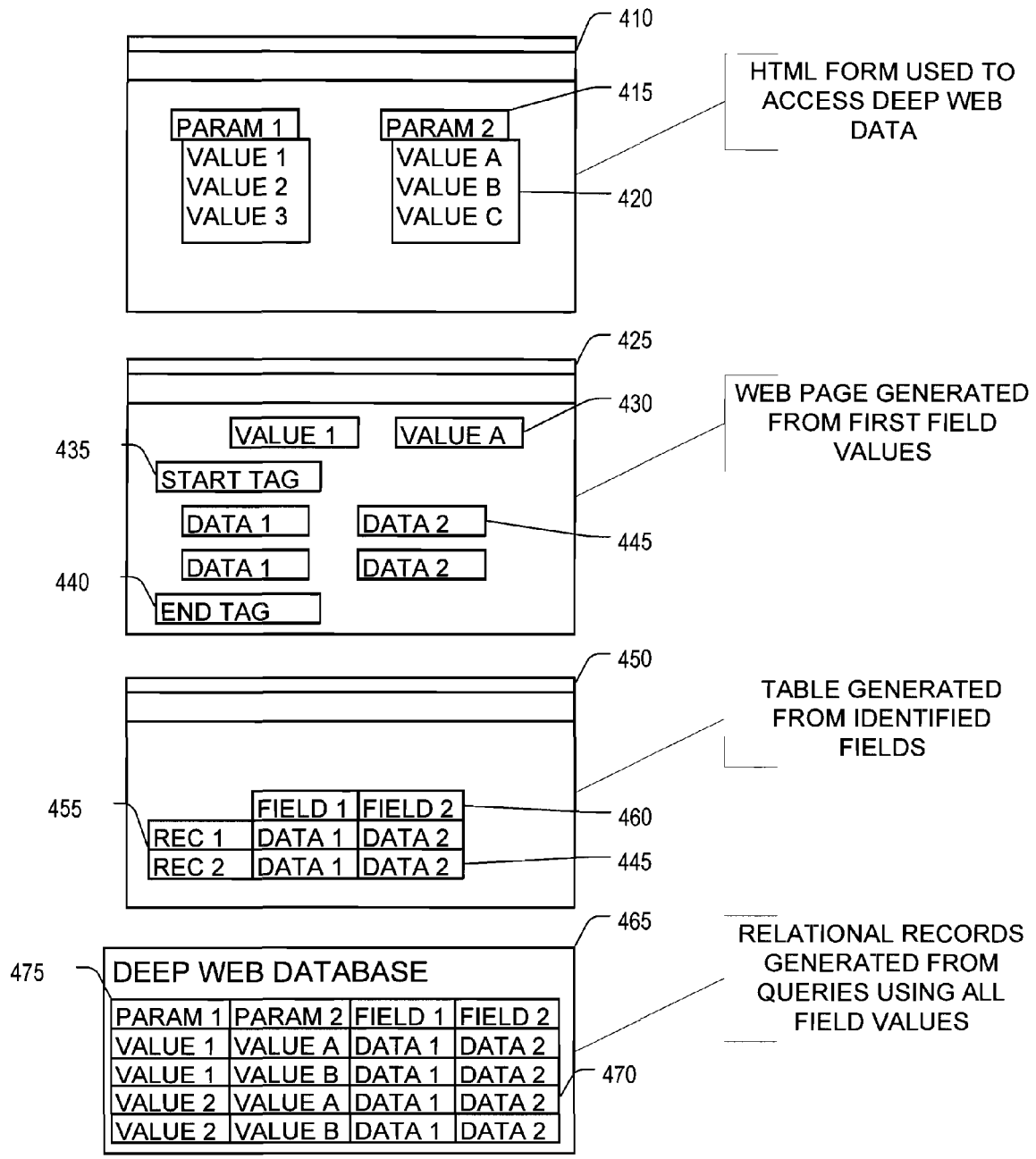
FIG. 5 is a block diagram that schematically illustrates representative information displayed to a user when identifying a deep Web data source for use by the knowledge acquisition element, in accordance with an embodiment of the invention.

FIG. 5 is a block diagram that schematically illustrates representative information displayed to a user when identifying a deep Web data source for use by knowledge acquisition element 110, in accordance with an embodiment of the invention. The figure shows the use and transformation of values from the identification of a deep Web data source to the resulting data stored in knowledge base 170.

A first window 410 in FIG. 5 represents an Internet browser window opened on a form that is used to query a deep Web data source. The form contains two fields 415 labeled PARAM 1 and PARAM 2. In this example, each field contains three selectable items 420. The items selectable for PARAM 1 consist of VALUE 1, VALUE 2 and VALUE 3. The items selectable for PARAM 2 consist of VALUE A, VALUE B and VALUE C. As indicated at steps 320 and 330 above, the user selects the two fields, PARAM 1 and PARAM 2, and the three items for each field listed above.

A second window 425 displays the results of a query 430 with PARAM 1 set to VALUE 1 and PARAM 2 set to VALUE A. The resulting response values from the deep Web site are preceded by a start tag 435 and followed by an end tag 440, used to delineate data 445 generated in response to the submission of the form. Equivalently, a start tag 435 and/or end tag 440 may consist of a sequence of tags and/or text. Alternatively, the start and end of the response be identified by textual style, a match to a semantic filter or a combination of manual and automatic identification methods. Data 445 is identified as a repeating sequence of displayed elements (containing two data elements labeled DATA 1 and DATA 2 in this example). Each repetition in the sequence may contain one or more elements and may contain the same fields or a variable number and/or type of fields among the repetitions. The identification of the start tag, end tag and repeated data elements is performed in step 350 of FIG. 4.

A third window 450 displays the table presented to the user in step 360 for confirmation of the desired extraction of data from the deep Web site. The table consists of rows 455, corresponding to the repeated data sequences identified above, and data 445 presented as columns 460 of the table. The individual data elements appear as data entries in the table.

A fourth window 465 presents a representation of the data extracted by the knowledge acquisition element 110 using the process described above. The form is submitted for each combination of parameters, and the resulting data is stored in knowledge base 170 as relational records 470 in a database table 475.

Building Sphere Ontologies

In addition to the processes of user-guided deep Web data extraction that are described above, knowledge acquisition element 110 can use known methods of semantic discovery to expand the set of data sources and ontology associated with a given sphere. For example, the following knowledge acquisition processes may be carried out concurrently for each sphere by the knowledge acquisition element 110:

Creation of a sphere-specific ontology and its subsequent refinement. Normally the initial ontology is created by sphere experts. Subsequent refinement includes the use of user-recommended relationships and tags.

Identification of data sources related to the sphere. Data sources may be manually identified by users and/or automatically identified by known semantic discovery methods.

Identification and storage of data relationships (triple statements, with a name or other term as the subject, followed by a verb and object that define the ontology of the subject, which can standardized in accordance with the RDF—Resource Description Framework—promulgated by W3C). Data relationships may be identified by users and/or by known methods of information extraction. Automatically identified data relationships can be highlighted by the semantic search user interface for confirmation, rejection or the assignment of a confidence value.

Creation of deep Web database records. Deep Web data sources are searched and the resulting Web pages are mined for data element. The data elements are cleansed, atomized and normalized before being stored in the deep Web database.

Furthermore, knowledge acquisition element 110 may carry out cross-sphere knowledge acquisition processes, including:

- Creation of an atom thesaurus containing synonyms of atoms. The atom thesaurus can be multi-lingual to support named element recognition in all stages of the acquisition, including discovery, mining, mapping and cleansing.
- Creation of atom filters to identify specific data element types for mining and cleansing of identified data elements.
- User creation of data element annotations. Annotations are user generated content linked to specific data elements, which can be queried at both global and more specific sphere levels.

Metadata associated with such knowledge sources may be maintained using existing standards, such as the Dublin Core®, which is described at dublincore.org, or the Publishing Requirements for Industry Standard Metadata (PRISM), promulgated by IDEAlliance Inc. (Alexandria, Va.).

To minimize the complexities of building and maintaining ontologies 150, the metadata ontology for the spheres may be service-oriented, dictated by the nature of the mashups that the members need. The metadata ontology may be managed top-down by experts for each sphere, with the addition of bottom-up user suggestions (and temporary use) of ontological extensions. Member suggestions are periodically reviewed by qualified sphere administrators, edited and approved, whereupon the standard extensions are automatically updated to include the temporary extensions. Independent member extensions at the metadata level are thus harmonized so that potentially divergent semantics converge on an ongoing basis.

To facilitate user extensions to sphere ontologies, user interface 140 may apply highlighting to guide users in tagging triples. The user interface may also sense RDF triples already created by others, highlighted and filtered as dictated by user preferences. Thus, for example, the user might want to see only RDF triples contributed by qualified users of the sphere.

As noted above, one of the objects of system 100 is to facilitate semantic convergence, i.e., seamless aggregation of information from multiple sites with different subjects. Semantic convergence requires that all members use the same ontology (or semantics) to tag their information. At the same time, for rapid development and adaptation of sphere ontologies, it is desirable that system 100 start with a small core ontology per sphere, which can then rapidly deepen, expand and evolve. Neither central management nor "crowd management" of ontology will generally be capable of meeting the conflicting needs for both adaptation and convergence. Therefore, in embodiments of the present invention, system 100 adopts a hybrid approach so that sphere semantics can keep pace with user needs while central processes assure semantic convergence over time. User interface 140 provides the means for users to expand the ontology related to a specific sphere by identifying new tags and relationships between data elements. The expertise level associated with each user can be used to limit the authorization of such users to administer semantic convergence.

Embodiments of the present invention also facilitate semantic convergence through use of a common semantic foundation across spheres for query processing (including an atom thesaurus and atom filters). This common semantic foundation and common initial ontology are important in achieving scalability of the ontological framework. These elements also provide a shared basis for semantic matching and fusion by allowing the identification of common structures through the presence of the same tags and relationships in disparate data sources.

System 100 also tags user annotations and associates them with specific Web segments so that they can be queried and inserted automatically into relevant mashups.

Furthermore, knowledge acquisition element 110 implements the following automatic activities:

- The aggregation of data elements using known methods of semantic matching and fusion.
- Periodic search of identified sources for changes. Identified changes can trigger user notifications that stored mashups will display different data from what was originally displayed.
- Iterative refinement of mined deep Web data and the semantic foundation (atom thesaurus and atom filters).

Figure 6:
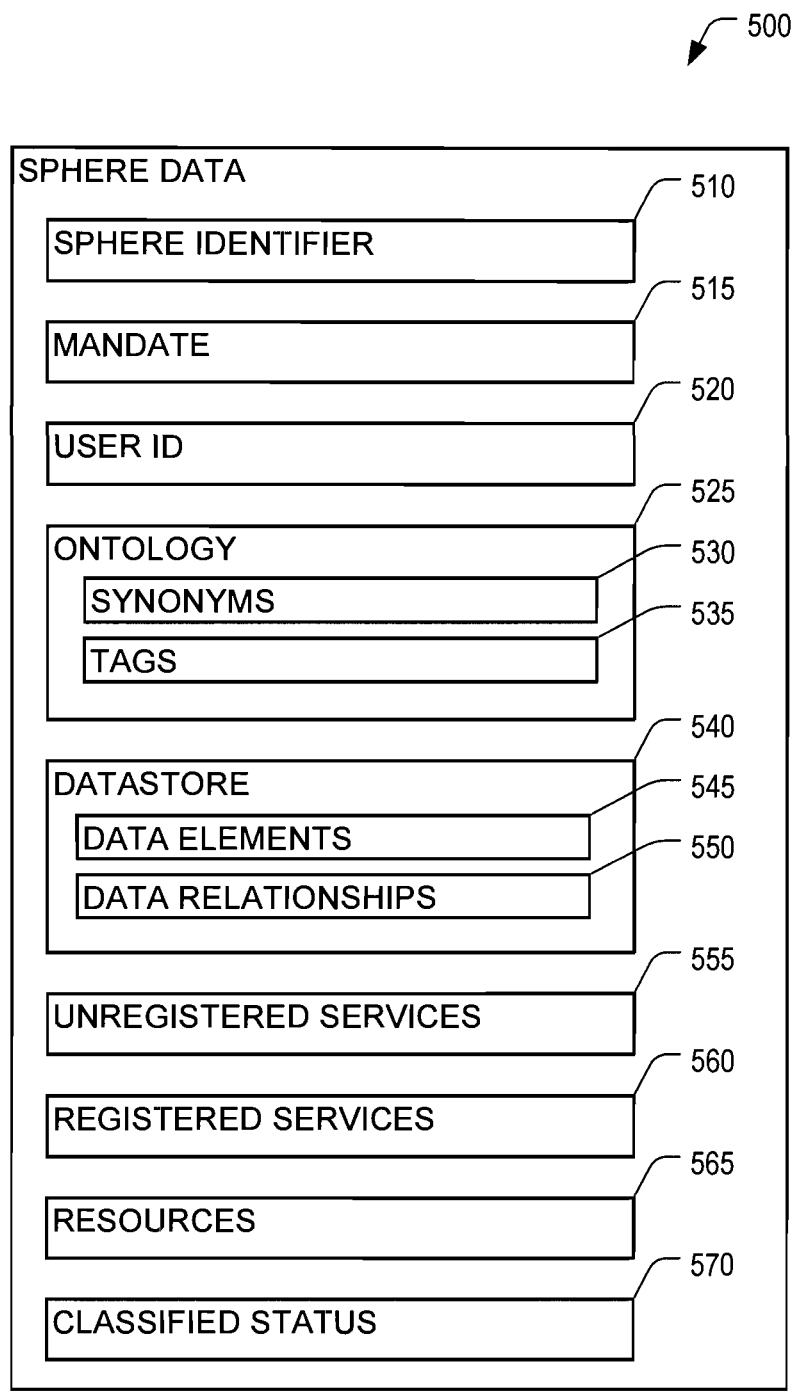
FIG. 6 is a block diagram that schematically illustrates elements associated with a sphere of knowledge, in accordance with an embodiment of the invention.

FIG. 6 is a block diagram that schematically illustrates elements of data 500 that are associated with a sphere of knowledge, in accordance with an embodiment of the invention. Each sphere has associated with it a unique name or identifier 510, mandate 515, user ID 520, ontology 525, services 555m 560, and resources 565.

Sphere name or identifier 510 is a unique value used to distinguish spheres.

Sphere mandate 515 describes the intended scope of the sphere. For example, a mandate might be one of Life Sciences, Medical, Job Hunting, etc. Sphere mandate 515 is used to classify spheres and to identify the general area of the sphere to potential users. It may also dictate sharing policies within and between spheres.

User ID 520 identifies the user who is currently using the sphere to process a semantic search. ID 520 will normally be the user name, but can also be a nickname, pen-name, avatar or no name. ID 520 may be used to retrieve user-specific values from user data store 160.

Ontology 525 is the semantic knowledge base serving the sphere, including synonyms 530 and tags 535. All spheres may share a common semantic foundation (atom thesaurus and atom filters) regarding basic types and entities that recur in many contexts, such as people, companies, locations, and products, for example.

A datastore 540 contains data elements 545 and data relations 550 identified through the use of deep Web mining methods, such as those described above. This datastore is used as a source of data elements and data relations for satisfaction of semantic queries by semantic search engine 120.

Unregistered services 555 are services that can be used to provide sources of data without user identification.

Registered services 560 are services that can be used to provide sources of data to an identified and (optionally) authenticated user. Examples of such services include subscription-based services providing news or data. The user may select all of the services or any subset for use in satisfying a semantic query. Use of a service may entail a subscription fee and/or authentication to the service.

Resources 565 are types of user resources, such as Web pages, that can be automatically engaged by registered and other sphere services via ontology 525 as authorized by an applicable sharing policy. The user may select any subset of such resources and indicate the location of these resources locally or on the network.

A classified status 570 is indicative of access restrictions. Classified spheres will not appear in the menus of user interface 140 until the user signs in with the required authentication method.

Defaults may be provided for the above sphere components allowing the rapid creation of new spheres.

Figure 7:
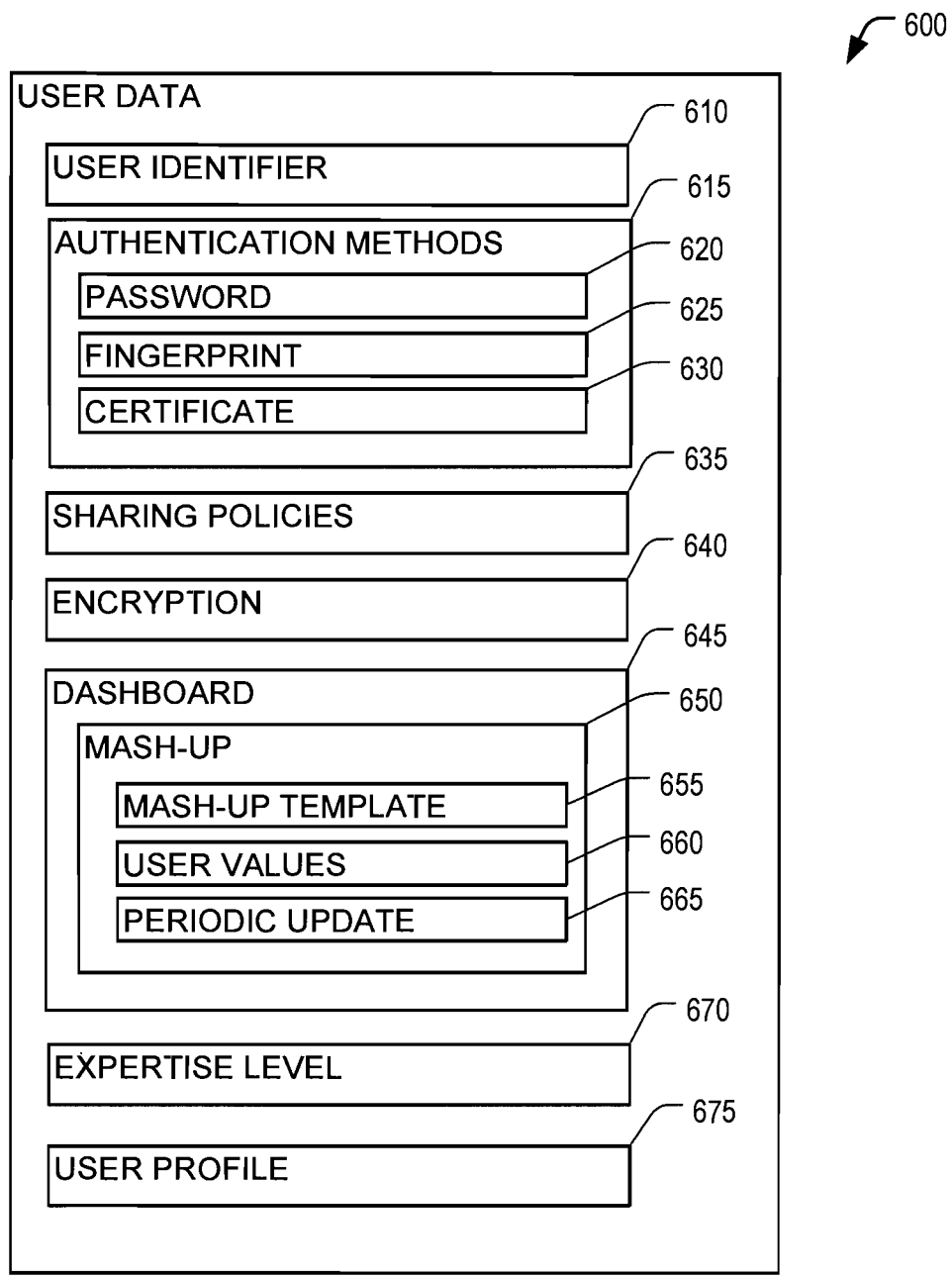
FIG. 7 is a block diagram that schematically illustrates elements associated with a user of a semantic search system, in accordance with an embodiment of the invention.

FIG. 7 is a block diagram that schematically illustrates elements of data 600 that are associated with a user of a semantic search system, in accordance with an embodiment of the invention. Each user has a unique identifier 610, authentication method 615, sharing profiles 635, encryption 640, dashboard 645 containing mashups 650, and expertise level 670.

User identifier 610 is a unique value used to distinguish users. The user identifier may be a real name, nickname, and/or generated value.

Authentication methods 615 are used to authenticate the user to control access to services, resources and/or data. Authentication methods may include, for example, account passwords 620, fingerprints 625, certificates 630 or other methods, such as random personal question from a bank of questions, or auto-sign-in. The level of user authentication is also sphere-dependent and may limit the availability of spheres and/or resources to the user. Spheres requiring higher levels of authentication than currently provided by the user may be indicated to the user to communicate the availability of such spheres without allowing access.

Sharing policies 635 determine which user assets will be visible to other sphere users and whether this visibility will be anonymous or identified with the creating user's identifier 610. User assets can include an ontology, data sources, data elements, and mashup templates, and can be marked with a weighted popularity of use of such elements.

Dashboard 645 contains templates 655 used to create mash-ups selected by the user. Each mash-up template 655 identifies the general data sources and structure for creating a mashup. Example mash-ups might include a directory of plumbers, a directory of doctors or a listing of apartments for rent. The mash-up template also stores user-specific values 660 that are used to instantiate the template for the specific user and thus personalize the general mash-up template. For example, if the template is a plumber directory, the values may include the location of the user to constrain the listing to plumbers in the user's local area, the type of piping used in the user's home, and whether emergency services or certification of the plumber is required. A periodic update field 665 is used to determine whether the mash-up will be generated periodically, and how often. The user may optionally be notified via e-mail or other means if the data in the mash-up has changed.

An encryption field 640 identifies data elements protected by encryption. Persistent sphere-related information is stored, and the user may decide to encrypt this information when it is outside the local host. All access to this information is then regulated and logged for user and third party auditing.

User profiles 675 contain user data required by the registered services for access authorization. The user can create a profile for a registered service, and the profile will then be used to provide values needed to access the service without reentering the values.

Defaults may be provided for the above user components, allowing the rapid creation of new user data in user data store 160.

Turning now to the actual knowledge that is collected by system 100, each "dot" (as defined above) is initially acquired in its original "raw" form and is subsequently enhanced in several dimensions, including the following:

Refinement of its semantic meaning with regard to a specific data element ID and the degrees of confidence in that ID.

Value refinement using known methods of cleansing, atomization and normalization.

Qualification refinement by specification of correctness, confidence values, time frame and reliability of the data source.

Each such dot is also associated with a contributing or identifying user and a well-defined data source for use in refreshing the dot. Some dots are contributed by user tagging of a specific value, field or content segment. Others are contributed by mining an entire family of pages, whereupon dots are organized within more structured records.

The identifying user attribute may be used to allocate a portion of revenue to the identifying user of a dot. After a given dot has been acquired, each subsequent mashup using the dot (e.g., the mashup template, one or more data sources, user identified data types, etc.) will generate revenue flow for data use from users to the operator of system 100. A part of these revenues may be apportioned to the identifying user of each dot based on a weighting of the importance of the dot in the creation of the instantiated mashup. The weighting of element importance may be a function of when the element was created or identified, as well as the type of element. By adjusting the weight to increase the value of elements identified earlier in relation to elements identified later, the weighting and remuneration system can be constructed to encourage participation in the early stages of sphere creation.

The semantics of a dot is typically defined by an ontological tag, referred to as an onto-tag. Onto-tags may be hierarchically structured. For example, the onto-tag for a composite education field with several atomic values could be "education," whereas the onto-tag for the second medical school value contained in that field could be "education.medschool". The onto-tags for a fully refined dot will be derived from the ontology. Additional temporal onto-tags may be defined for dots that have yet to achieve full refinement, and these onto-tags, too, are linked to specific ontological elements, as later described. Temporal onto-tags are used to specify time-type aspects of the dot, such as that the dot describes data for a specific year, month or data range.

Figure 8:
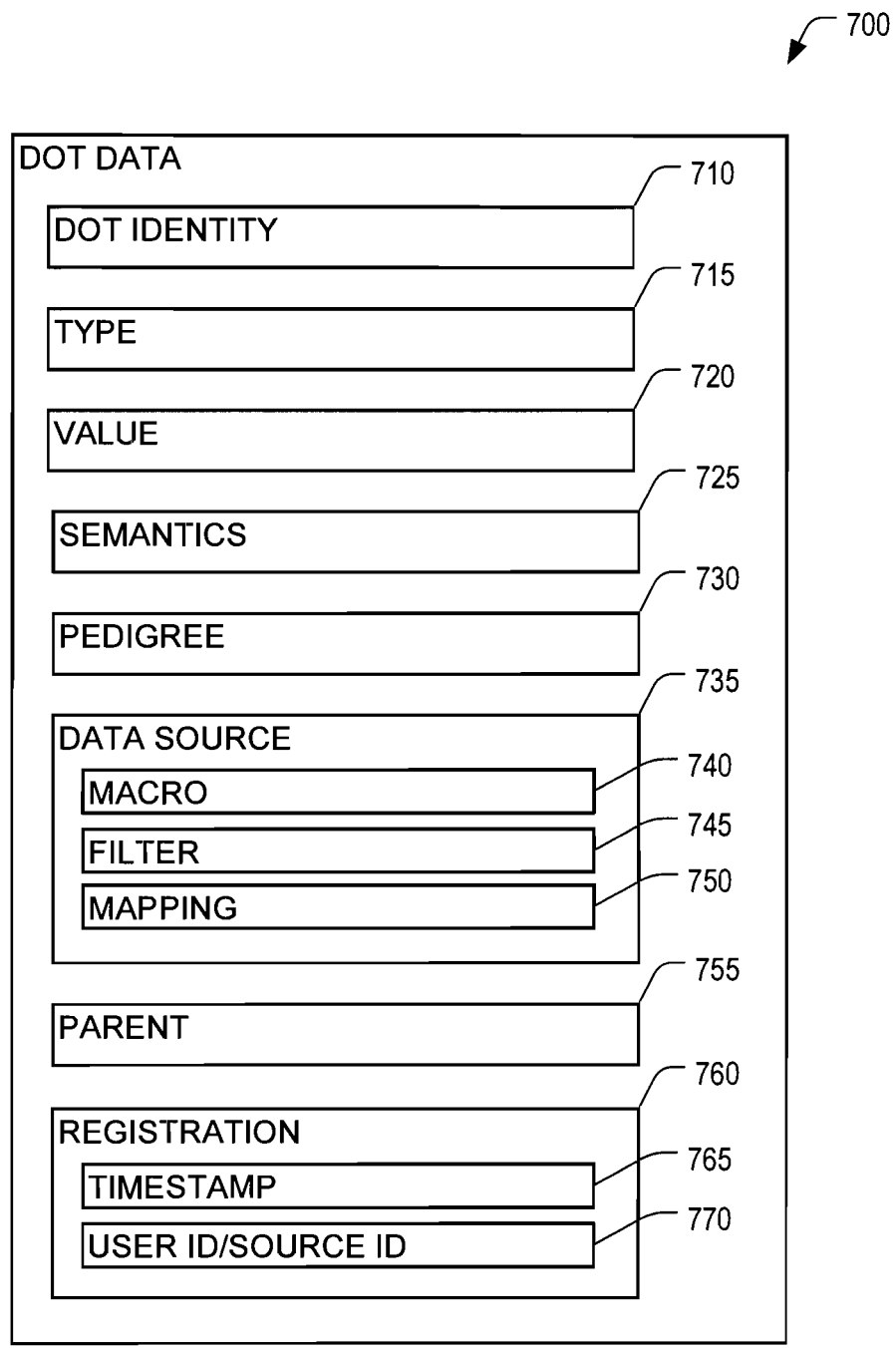
FIG. 8 is a block diagram that schematically illustrates elements associated with a dot in a semantic search system, in accordance with an embodiment of the invention.

FIG. 8 is a block diagram that schematically illustrates elements associated with a dot 700 in semantic search system 100, in accordance with an embodiment of the invention. Each dot has the following characteristics:

A dot identity 710 used to uniquely identify the dot.

A type 715. Examples of dot types can include atomic value, Web page, figure, table, paragraph, field or annotation.

A value 720, representing the actual value of the dot separate from the other attributes of the dot, which may considered meta-data describing the dot.

Assumed semantics 725 for the dot value, typically an onto-tag.

A pedigree 730, indicating the reliability of the knowledge used to produce the dot. The pedigree can indicate, for example, that the dot was normalized using a moderately-qualified synonym.

Possible association to a data source 735, for automatic extraction of the dot from the associated data source. The data source attributes will provide a macro 740, filter 745 and mapping 750 needed extract the dot from the data source.

A parent 755 dot ID, which recursively identifies a hierarchy of dots containing this dot in a data source. Example sources of a dot may be an enclosing field containing one or more atoms, each of which is dot, or a Web page containing the field, or a Web site containing a Web page.

Registration information 760 with a time stamp 765 indicating when the dot was tagged and possibly a user ID 770 indicating by whom. If the dot was mined as part of a specific page or source, the registration will be associated with a source ID or page ID instead of a user ID.

User Interface

User interface (UI) 140 to needs-based semantic search system 100 provides a set of tools and controls that simplify interaction between users and system components. Screen shots illustrating an implementation of such a user interface are shown in an Appendix to the above-mentioned provisional patent application (but are omitted here for the sake of brevity). The user interface enables the user, inter alia, to tag data elements of interest in documents retrieved through system 100. The system applies these user-supplied tags in updating sphere-specific ontologies for subsequent use not only by this user, but also by other sphere participants.

UI 140 allows the user to view the spheres that are available and to select a sphere for use. The available spheres may be viewed in order of popularity. Selection of a sphere allows the user to operate on the sphere, including the ability to select mashup templates for instantiation. Mashup templates are instantiated with search parameters and/or filters to create a personalized mashup. UI 140 also provides a user-specific context to the assets produced by each sphere. This context may be provided by a toolbar or application installed in a generally-available Web browser or as a separate, standalone, application.

User interface 140 also allows the user to manage dashboard 645 that is associated with the user. Dashboard management includes the ability to add or remove mashups 650 from the dashboard, and to select a mashup from the dashboard for display and/or editing. Adding a mashup to the dashboard renders the mashup persistent. Persistent mashups may be selected for use without having to repeat the definition of the parameters and/or constraints used to instantiate the template in creating the mashup. In addition, a persistent mashup that uses deep Web data may be configured for periodic update with optional notification to the user if the data in the mashup changes.

As noted above, the user interface also provides a means of gathering user-provided information (typically in the form of tags) regarding data elements, data relationships and user evaluation of mashups. User-provided information regarding data elements includes the type of the element (if untyped), confirmation or rejection of the data element type if the data element has been previously typed, annotation of data elements, and identification of new data elements. For tabular data, system 100 may identify one or more recommended data element types for each column, using the sort of semantic mapping techniques described above. Data elements in a mashup table are identified by their row and column in the mashup table. The user interface maps actions performed within a cell at a specified row and column of the mashup table with the data element(s) used to create the information displayed at the specified row and column.

In addition, the user interface provides means for displaying unstructured text, for example a Web page or news feed. The display may include highlighting of data entities and/or relations found through semantic analysis of the unstructured text using the ontology component of a sphere. The data elements may be found using known methods of named entity recognition, for example. The found data elements can be typed using atom filters, as are known in the art, or by user specification of type. Data relationships found through the use of information extraction techniques can also be displayed for user confirmation or rejection and optional annotation.

The user interface also can also provide a method of traversing data source attributes of data elements, thus allowing the user to view the source material from which the data element was extracted.

The user interface enables the user to build queries by the following process:

The user begins by choosing a primary entity of interest, such as people, and the entity attributes of interest, e.g., names, addresses and email. The primary entity may be selected from a combo box and possibly derived automatically by clicking on a highlighted named value that has already been identified as such an entity.

Each entity is related by the ontology to additional entities. Thus, for example, a person can be related to a company and a specific position. The user can recursively choose additional entities related to a chosen entity within their attributes of interest—thereby inferring joining information from multiple entities. Various methods of joining can be applied, in terms of the manner of joining (outer, partial), as well as the keys (virtual, global, foreign) to be used.

The user can constrain attributes from any of the selected entities, e.g., all people with a specific position in a company that has revenues exceeding a certain value. System 100 saves and ranks historical constraints for the same ontological values according to which values were latest or most popular, so that the user can readily reuse them. In many cases, the user can adopt a query template that has already selected the entities and attributes to be constrained and collected but has yet to specify the values for the constraints, whereupon the user need only specify values for the constraints and submit the query.

The user may choose to sort and group the results in a certain way. For example, the user may choose a sourcing mashup to use only dots found within those sources. Alternatively or additionally, the user may specify that only dots with a qualified pedigree be used to populate the mashup.

The ontology may define any number of attributes and relationships per entity, but the user interface will show only those attributes and relationships that have available information within the prescribed source set. The user interface may also rank the attributes by collective or personal popularity and history, collapsing the lesser-used attributes so that the user can open them only if the depicted attributes are insufficient. This feature enables query building with a relatively small display.

Each query will produce two mashups:
  A mashup of results: The results consist of tabulated dots, so that the history of each dot is readily reviewed.
  A mashup of the sources used to produce those results.

The user interface features described above, taken together with the methods and data structures that are shown in the preceding figures, enable system 100 to achieve a number of important benefits:

Crowd acquisition—The user interface tools that are described above are sufficiently intelligent and user-friendly to automate nearly all of the knowledge acquisition activities, requiring only minimal user direction, which can be provided by non-experts. All of the foreground "manual labor" can thus be accomplished collectively aided by intelligent wizards. A much smaller group of crowd-sourced experts can subsequently focus upon building the core assets that promote and guide these collective activities, by sorting and ranking of the knowledge sources. The threshold for user contribution is thus significantly lowered.

An evolving multi-tiered ontology—A multi-tiered service-oriented ontology structure promotes semantic convergence while enabling the operational environment to sustain service even as user requests drive ontological evolution. Instead of industry-wide semantics, the acquired content is organized within service-oriented "spheres," each with its own semantics. Moreover, the ontological evolution within each sphere is accomplished without requiring any rework per version.

A decision-oriented user experience—User-directed deep Web mining, name entity recognition, highlights, and semantic tags all use the same semantics per sphere so that all extracted information can be automatically aggregated. Shared semantics and proactive highlighting by users promote semantic convergence.

Precision advertising—The new user experience paves the way to precise yet anonymous user profiling without monitoring user behavior, i.e., without invading privacy. This profiling, in turn, can be used in precise and more timely advertising, improving the advertising experience from both advertiser and consumer perspectives.

Building and Using a Super-Ontology

FIG. 9 is a flow chart that schematically illustrates methods 900, 910 for creation and use of super-ontology 28, in accordance with an embodiment of the present invention. In method 900, system 100 builds a super-ontology from multiple sphere-specific ontologies 26, which are created at step 920. The sphere-specific ontologies are created in a spherical stage 912, which leads on to a super-ontology stage 914. Although stages 912 and 914 are shown in the figure as being distinct and sequential, they may in fact go on continually in parallel, with refinements to sphere-specific ontologies feeding the super-ontology, and vice versa.

To create sphere-specific ontologies 28, users (including expert users) identify elements 922 and their types that are relevant to the sphere. Examples of such elements for an ontology in the area of doctor referrals may include Doctors, Hospitals, Medical Schools, and Ailments. Additionally, ontology definition typically includes an identification of the structures 924 of these element types and relationships 926 between the element types. For example, the informational structure of a Doctor entity type may include where the doctor studied (itself an instance of the Medical School entity type), where the Doctor practices (an instance of the Hospital entity type), and the specialty of the Doctor (often as a list of Ailment entities). Thus, each Doctor entity is defined as possibly being related to one or more Medical Schools (for example by a graduated-from relationship), one or more Hospital entities (for example by a practices-at relationship), and one or more Specialty elements (for example by a has-specialty relationship).

The identification of the structure and relationships is often an iterative process, in which entity types, structures and relationships may be defined in any order. Users in the relevant sphere may use tagging capabilities offered by user interface 140 to mark and annotate these entities and relationships. System 100 (possibly under the supervision of sphere experts) uses the tagging information to supplement the sphere-specific ontologies and knowledge base 170.

The creation of super-ontology 28 in stage 914 uses the commonality of elements and element types (including their structure and relationships) to match elements 930 representing different facets of the same entities. For example, while a Doctor may be defined as described in the above example for a medical referral sphere, a Doctor may be defined differently for a sphere concerned with retrieving bibliographic information on medical publications. Some information, such as the doctor's name, and professional associations (possibly either the medical school where the doctor performed some research or a hospital where the doctor practices), is expected be common to both spheres. On the other hand, the medical referral ontology might not include the publications of the doctor, and a bibliographic sphere might not include the current associations of the doctor (only the associations current at the time of publication).

With sufficient information in each of the sphere-specific ontologies, system 100 is able to identify common elements occurring in each domain by matching the values of shared elements, such as names, addresses, and past associations in the present example. Example algorithms for this purpose include Quinlan's ID3 and C4.5 algorithms (as described, for example, by Hastie et al., in *The Elements of Statistical Learning*, Springer Verlag, 2003, which is incorporated herein by reference).

The confidence level in the matching of elements between spheres will depend on the extent of the commonality in the definitions of the element types, and in the degree to which the elements within the element types share common values. For example, if the element types share few common elements, such as name and address, which are shared by many element types related to people, the apparent matching may be spurious. If the matching is based on structural features that are unique to the element types in each of the sphere-specific ontologies, however, confidence in the matching will be higher.

The confidence in the match may be further increased by examining known values in each domain. If the instances of a given element type not only share structural and relationship commonality, but also have the same values in the data stored under the ontologies of different spheres, then it is likely that these element types refer to the same elements. For example, if the Doctor element types in share doctors' names and medical schools, and for many of the individual doctors the sphere-specific data each contain an instance with the same name and also the same medical school, it is unlikely that system 100 is erroneously matching the Doctor element type in one sphere to an element in another sphere that represents the general population or nurses.

Once matching elements have been identified at an acceptable confidence level, the structures and relationships may be merged 932. Normally the merged ontology will include all structural elements found uniquely in any sphere-specific ontology, while the common structural elements found in matching process 930 are merged to reduce duplication and to identify synonyms in the sphere-specific terminologies. The resulting merged element definitions are then stored 934 in super-ontology 28, together ontology-specific naming 936, including the synonyms identified for use in mapping the super-ontology terminology to and from the sphere-specific terminologies.

The merged element definitions may also be used to merge data values 938 associated with elements in the sphere-specific element databases. The process of data merging is similar to that used in merging the element type definitions, and includes identification of matching elements by the values stored for each element. For example, the elements representing doctors in the medical referral domain could be matched to the doctors in the bibliographic domain by name, medical school and (past or current) associations. Use of multiple values increases the confidence that the elements in the different sphere-specific ontologies represent the same actual doctor in this case.

In method 910, system 100 uses the merged element definitions and data to support efficient extraction of values. The extraction of values begins with the definition of a query 940 via user interface 140. In this example, it is assumed that the query is formulated using sphere-specific terminology. When the query is submitted for processing, search engine 120 translates the query 942 from the sphere-specific terminology to the terminology used by the super-ontology. The use of the super-ontology terminology for query processing allows system 100 to store the entities and their values using a single terminology, even though the queries may be created in one of several sphere-specific terminologies.

Search engine 120 processes resulting query in the super-ontology terminology in order to retrieve elements and values 944 from entity database 24. The results may then be translated 946 back to the sphere-specific ontology terminology that was used to formulate the query (or to the terminology of any other suitable sphere-specific ontology or even left in the terminology of the super-ontology if desired). The translated results may then be returned 948 to the user, again using the same terminology used by the user to formulate the original query. The use of the same terminology for both formulating the query and for presenting the results, even though the actual entities and values are stored using the super-ontology terminology, results in easier creation of queries and easier comprehension of the results.

FIG. 10 is a flow chart that schematically illustrates a method for definition of an ontology using super-ontology 28, in accordance with an embodiment of the present invention. The same sequence of actions may also be used in modification of an existing sphere-specific ontology.

Creation of an ontology 1002 commonly includes identification of source data sites or locations 1004. System 100 typically identifies sources by identifying one or more starting locations (start pages) 1006 and methods to be used in navigating 1008 from these pages to other relevant Web pages. The navigation methods may be as simple as following links from one page to another or, in the case of deep Web mining, may include data-directed page generation, as described above, wherein pages are generated by completing forms using value options present in the form or taken from a stored list of options, and then submitting the forms for processing.

Each page generated in the above manner may also include a definition 1010 of the elements contained in the page and methods for extracting the elements and their values from the page. (This process is commonly called "scraping.") Definition of elements on Web pages may be carried by sphere experts, since the recognition of important elements and values typically requires a knowledge of the sphere and how data in a Web page relates to the sphere.

In the presence of super-ontology 28, the definition of data extraction may be simplified and improved by the use of existing element definitions as templates or guides for the definition of data extraction on new Web pages. For example, when defining a new sphere-specific ontology that contains a Doctor element type, the sphere expert may be able to view various existing definitions of Doctor element types from both other sphere-specific ontologies 26 and super-ontology 28. These resources facilitate the definition of the new Doctor element type, as the sphere expert may be able to use an existing Doctor element type definition or may be able to modify an existing Doctor element type definition for use in the new domain. Even if an existing, or modified, Doctor element type definition is not used, the ability to view the definition of Doctor element types as used in other domains may improve the accuracy or completeness of the Doctor element type in the new domain.

As the elements types of the new sphere are created, the new element types may be merged into super-ontology 28 using either the process described in reference to FIG. 9, or by incorporating modifications of an existing element type 1012 as changes to the element type in the super-ontology. This method provides a cycle of element type improvement and expansion, since the newly modified element type definitions are available for future use as described above. The method results in shared learning that can lead to continual improvement of the super-ontology, sphere-specific ontologies (wherein the changes are propagated back to other sphere-specific ontologies), data extraction methods, and retrieval of values.

The final step in creating the sphere-specific ontology is storing element definitions 1014 for use in subsequent data extraction and value retrieval.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data access, comprising:
defining an ontology including a structured vocabulary of entities, types of the entities and relations between the entities, pertaining to a given sphere of knowledge;
receiving in a computer a search query generated using the ontology;
providing to a user of the computer at least one document in response to the query;
receiving in the computer ontological tags, indicating for data elements in the document a semantic nature of the element, associated with data elements in the at least one document; and
automatically updating the ontology, by the computer, responsively to the ontological tags.

2. The method according to claim 1, wherein providing the at least one document comprises retrieving a deep Web database table from a Web site.

3. The method according to claim 2, wherein retrieving the deep Web database table comprises receiving multiple Web page documents from the deep Web database table Web site, in response to respective different search queries;
automatically extracting and filtering the data elements from the received Web page documents for updating the ontology, based on the different search queries; and
presenting the data elements to the user as relational records in the table.

4. The method according to claim 3, wherein automatically filtering the data elements comprises applying multiple filters to generate multiple, respective relational records for selection by the user, and choosing one of the filters responsively to the selection made by the user.

5. The method according to claim 3, wherein automatically filtering the data elements comprises automatically analyzing a structure of the Web pages in order to construct a filter for application to the data elements.

6. The method according to claim 2, wherein automatically updating the ontology comprises identifying and incorporating a field label from the database table into the ontology.

7. The method according to claim 1, wherein automatically updating the ontology comprises automatically updating the ontology with synonymous terms identified in the document.

8. The method according to claim 1, wherein automatically updating the ontology comprises updating the ontology with relationships between entities in the ontology and entities identified in the document.

9. The method according to claim 8, wherein updating the ontology comprises automatically identifying, by the processor, possible additions to the ontology and presenting the automatically identified possible additions to a user for confirmation.

10. The method according to claim 1, and comprising gathering multiple dots from data sources in the sphere, and automatically tagging and aggregating the dots responsively to the ontology.

11. The method according to claim 1, wherein defining the ontology comprises defining one of a plurality of sphere-specific ontologies that are commonly associated with a super-ontology, and wherein automatically updating the ontology comprises propagating an update to the topology to one or more others of the sphere-specific ontologies via the super-ontology.

12. The method according to claim 1, wherein receiving the ontological tags comprises receiving the ontological tags from a user after the document is provided in response to a query.

13. The method according to claim 1, wherein receiving the ontological tags comprises extracting the tags from the document.

14. The method according to claim 13, wherein extracting the tags from the document comprises identifying field labels in structured or semi-structured portions of the document and using the field labels and field content in updating the ontology.

15. The method according to claim 13, wherein extracting the tags from the document comprises identifying a short list of tags for selection for semi-structured data of the document and receiving a user indication of the tags to be used for the data.

16. A method for data access, comprising:
   receiving in a computer multiple ontologies, each ontology pertaining to a respective sphere of knowledge and including a structured vocabulary of entities, types of the entities and relations between the entities;
   automatically identifying commonalities between the ontologies;
   based on the commonalities, building a super-ontology containing elements that are common to multiple spheres of the knowledge; and
   automatically defining an ontology for a specific sphere of knowledge based on the super-ontology.

17. The method according to claim 16, wherein identifying the commonalities comprises matching an entity that occurs in the ontologies of two or more of the spheres.

18. The method according to claim 17, wherein building the super-ontology comprises merging into the super-ontology relationships and structures that are associated with the entity in each of the ontologies.

19. The method according to claim 17, wherein identifying the commonalities comprises automatically assessing a confidence of the matching of the entity between the ontologies, and wherein building the super-ontology comprises deciding whether to merge the entity from the two or more of the spheres into the super-ontology based on the confidence.

20. The method according to claim 16, and comprising merging data values that are respectively associated with the spheres of knowledge into a common knowledge base responsively to the super-ontology.

21. The method according to claim 16, and comprising receiving a query from a user in terminology associated with the ontology of one of the spheres of knowledge, and translating the query into the super-ontology in order to generate a response and translating the response back into the terminology associated with the ontology of the one of the spheres of knowledge for presentation to the user.

22. The method according to claim 16, wherein automatically identifying commonalities between the ontologies comprises identifying common element types by matching the definitions of the element types in the different ontologies.

23. The method according to claim 16, wherein automatically identifying commonalities between the ontologies comprises identifying common element types by matching the elements of the element types in the different ontologies.

24. The method according to claim 16, wherein automatically identifying commonalities between the ontologies comprises identifying matching elements by matching values stored for the elements.

25. Apparatus for data access, comprising:
   a memory, configured to store an ontology pertaining to a given sphere of knowledge and including a structured vocabulary of entities, types of the entities and relations between the entities; and
   a processor, which is configured to receive a search query generated using the ontology, to provide to a user of the apparatus at least one document in response to the query, to receive ontological tags, indicating for data elements in the document a semantic nature of the element, associated by the user with data elements in the at least one document provided in response to the query, and to automatically update the ontology responsively to the tags.

* * * * *

UNITED STATES PATENT AND TRADEMARK OFFICE
CERTIFICATE OF CORRECTION

PATENT NO.       : 8,874,552 B2  
APPLICATION NO.  : 13/511382  
DATED            : October 28, 2014  
INVENTOR(S)      : Jair Jehuda Page 1 of 1

It is certified that error appears in the above-identified patent and that said Letters Patent is hereby corrected as shown below:

On the Title Page, Item (73) Assignee name should be KINOR TECHNOLOGIES INC.,

Signed and Sealed this  
Seventeenth Day of February, 2015

Michelle K. Lee  
*Deputy Director of the United States Patent and Trademark Office*